United States Patent [19]

Alexoff et al.

[11] Patent Number: 4,858,123
[45] Date of Patent: Aug. 15, 1989

[54] MANUFACTURING LOTTERY TICKETS AND COMMERCIAL COUPONS

[75] Inventors: Carl Alexoff, Cherry Hill; Richard Rosetta, Kendall Park; Michael Dennis, Dayton; Thomas E. Coll, Lambertville, all of N.J.

[73] Assignee: Webcraft Games, Inc., Brunswick, N.J.

[21] Appl. No.: 217,137

[22] Filed: Jul. 5, 1988

Related U.S. Application Data

[63] Continuation of Ser. No. 54,056, May 26, 1987, abandoned, which is a continuation of Ser. No. 643,722, Aug. 24, 1984, abandoned.

[51] Int. Cl.$^4$ .............................................. B42D 15/00
[52] U.S. Cl. ................................ 364/412; 273/138 A; 283/901
[58] Field of Search ........... 364/412; 273/139, 138 A; 283/901, 903, 101, 103, 1 A

[56] References Cited

U.S. PATENT DOCUMENTS

| | | | |
|---|---|---|---|
| 3,900,219 | 8/1975 | D'Amato et al. | 283/903 |
| 3,956,049 | 5/1976 | Johnsen | 283/139 |
| 4,033,611 | 7/1977 | Johnsen | 283/101 |
| 4,299,637 | 11/1981 | Oberdeck et al. | 273/139 |
| 4,398,708 | 8/1983 | Goldman et al. | 273/138 A |

FOREIGN PATENT DOCUMENTS 2023498  1/1980  United Kingdom ............... 273/139

Primary Examiner—Jerry Smith
Assistant Examiner—Kim Thanh Tbui
Attorney, Agent, or Firm—Shlesinger & Myers

[57] ABSTRACT

A system and method for computer controlled imaging of lottery and commercial coupons on a moving continuous web provides substantially improved security and prize structure integrity through the use of two independently controlled computer imagers whereby the second imager is used to image ticket serial numbers only when monitoring of prior imaged data by the first imager ensures that ticket serial numbers are only placed on valid tickets and not on defective and/or voided ticket stock.

22 Claims, 5 Drawing Sheets

FIGURE 8a
FIGURE 8b
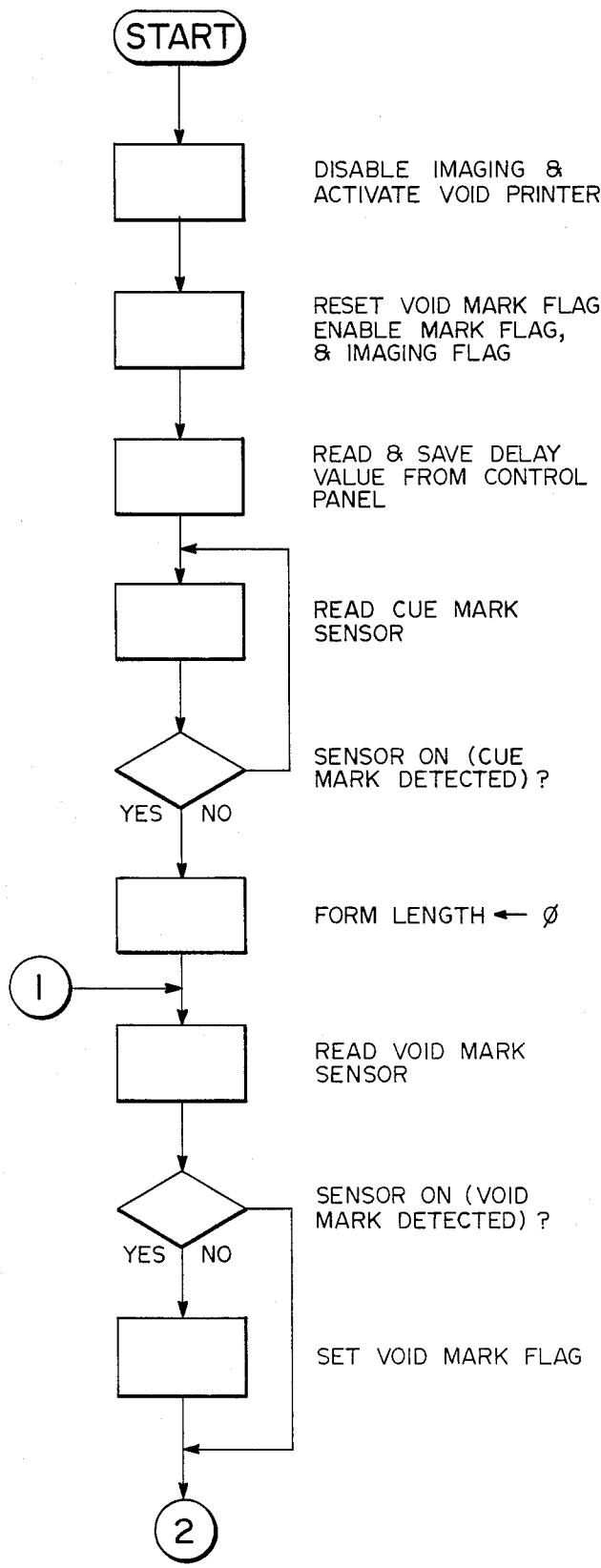
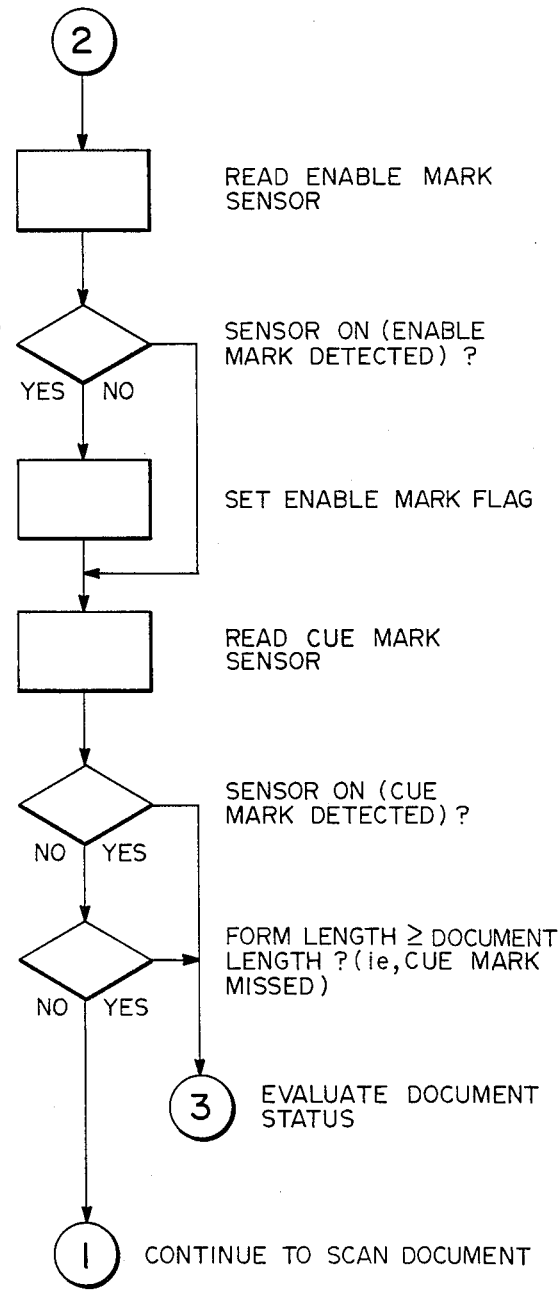

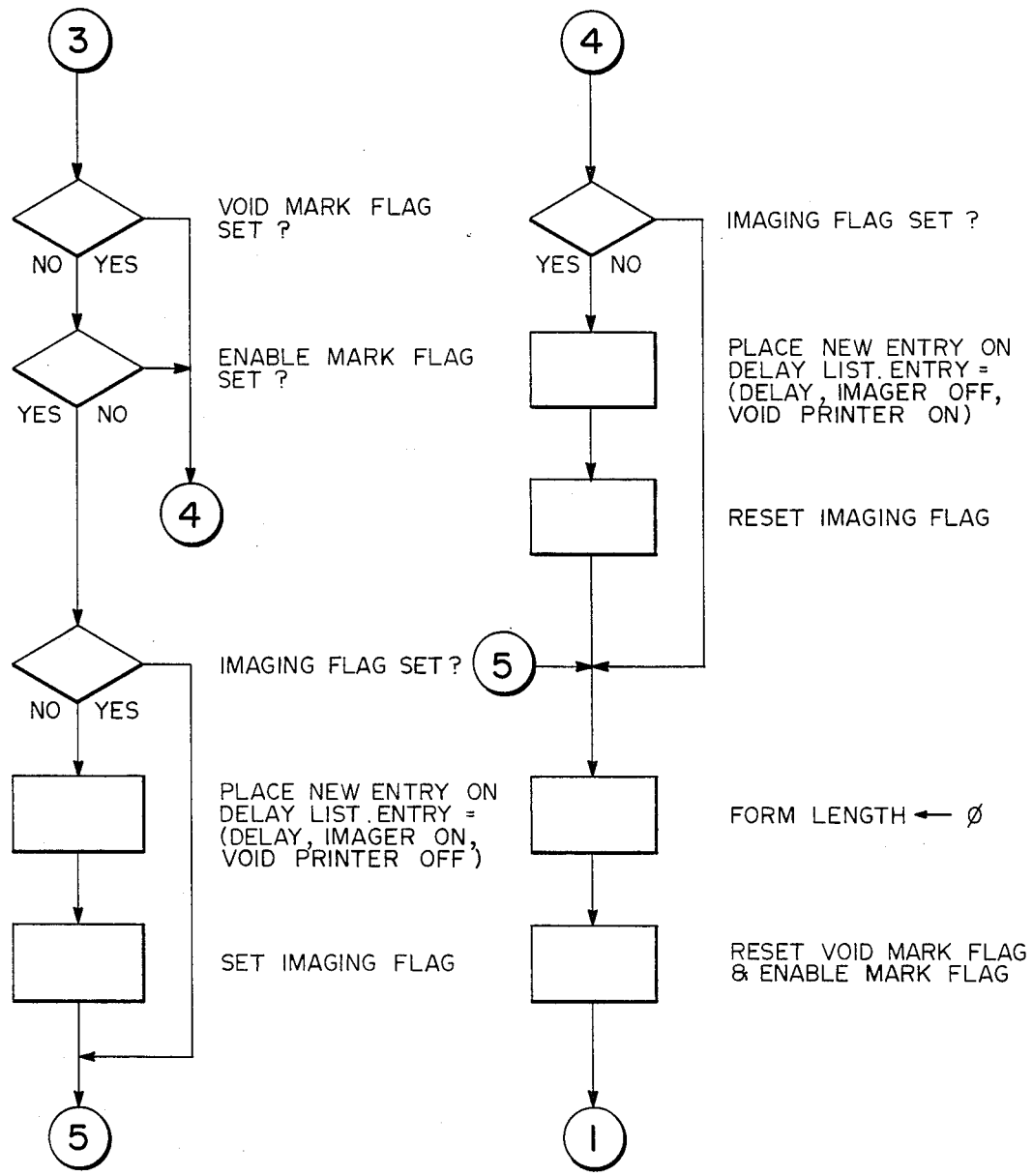

MANUFACTURING LOTTERY TICKETS AND COMMERCIAL COUPONS

This application is a continuation of application Ser. No. 054,056 filed 5/26/87 now abandoned, which is a continuation of application Ser. No. 643,922, filed 8/24/84, now abandoned.

BACKGROUND OF THE INVENTION

This invention relates to printing of lottery and coupon tickets, and particularly to those that are produced by the computer printing process for instant lottery tickets and commercial coupons.

Within the last ten years large lottery games for the general public have been run by many State lottery commissions. These commissions raise funds for State operation by "instant lottery" games in which tickets are sold to the general public and are immediately on purchase checked against previously known winding ticket numbers, or game play data combinations.

These lottery tickets have the winning number or game play data printed on the face thereof which is hidden by a coating layer. The purchaser of the ticket rubs off the scratch-off coating, thereby destroying it, in order to learn the game play data combination on the ticket which possibly might match the known winning combination for the lottery.

Millions of tickets are sold by the State lottery commissions. The prizes in the form of money winners are large, and a single ticket might be worth several millions of dollars won via grand prize drawings.

The State lottery commissions which run these "instant lottery" games act as distributors of these tickets.

The actual games themselves, and the services with respect to them, including printing of the millions of tickets to be sold, are obtained from printing suppliers. Contracts for such games are normally awarded on a bid basis. The contractor is required to furnish the related game services as well as to provide adequate security guarantees. Also written guarantees are required from the contractors with respect to the ratio of prizes paid out through winning tickets to the total revenues derived from the sale of tickets. This ratio is known as the prize structure for a particular instant game.

The tickets are produced on high speed presses and game play data (winning number combinations) and identifying control/validation numbers are printed on the tickets by computer controlled ink jet imagers.

In these lottery games, where millions of tickets are printed and subsequently sold, it is important that the identity of the winning number combination on the given ticket can not be determined until after the ticket has been purchased and the coating has been removed. Compromizing of security, that is identifying of the ticket game play data before purchase, must be prevented to ensure successful operation of the games.

Computer-controlled imaging of the game play data and control numbering on the tickets has come into widespread use because of the high production rates, greater economies and the greater security provided than the previously used sheet printed production process.

In the computer imaged process, the game play data for each lottery ticket, that is, the ticket winning or loosing number combinations are generated by computer techniques in which the game play data are scrambled through complex computer algorithms, and are placed on magnetic tapes along with other ticket control information. The magnetic tapes are inputted to the computer controlled ink jet imagers and control the data that are printed on the successive lottery tickets.

The numbers that eventually are printed on successive lottery tickets are all part of a complete group or pool of numbers, all of which are scrambled and applied in what appears to be a random fashion. The numbers are mixed to produce a successive listing of successive random numbers which are then applied to the successive tickets. The numbering is sufficiently complex to prevent discovery of the relationship between the tickets that are printed in successive fashion. This list of successive random numbers is supplied from magnetic tapes which control operation of the ink jet imagers.

It is also necessary to supply a serial number in the form of a Pack/Book-ticket number and/or a covered (or uncovered) validation number to each ticket for identification, distribution control, and validation purposes. The serial numbers and/or validation numbers must have a relationship to the covered game play data combinations to permit the lottery operator to validate winning tickets and to readily determine that the winning game play data has not been altered or counterfeited. This is possible only if there is a relationship between the serial number and/or validation number of the ticket and the game play data applied to the tickets in a single pass through the press.

This single pass process also means that the game play data, the serial numbers, and/or the validation numbers are generated from the same control tape which commonly controls the ink jet imager that applies this data on the tickets. Although not a practical problem, there is a theoretical possibility of an individual in the production process being in collusion with other individuals involved in the computer program process and state lottery employees involved in the distribution of tickets, to learn the location of a winning ticket at a particular sales outlet.

If the game play data and the ticket serial numbers are not imaged at the same time, the correlation between them is broken. Since the serial (pack/book-ticket) numbers are used to control the inventory, accounting and distribution of tickets to sales agents, the theoretical possibility of tracking a winning ticket through the data generation/manufacturing/distribution process is eliminated. This is accomplished by a two pass production process whereby two separate ink-jet imagers are used to independently apply: (1) the game play data and the validation number on the face of the ticket during the first pass through the press, and (2) the ticket serial (pack/book-ticket) numbers on either the front or the back of the tickets with a second ink-jet imager during the second pass.

Additional security can be obtained in this two pass method by random selection of rolls of tickets imaged on the first line containing the first machine for further processing the second process line.

If the game play data and the ticket serial numbers are not imaged at the same time, on interruption of imaging of the game play data, the independent printing of a serial number or numbers to the defective ticket would result in loss of those ticket serial numbers. Frequent interruptions in the first pass imaging of tickets is not uncommon, and in such cases large blocks of assigned serial numbers from the pool of tickets would be wasted on voided first pass tickets. This could adversely effect the integrity of the prize structure and create other problems unless the application of the ticket serial numbers to valid first pass tickets is closely controlled. Ideally, ticket serial numbers should only be applied when valid game play data exists on the ticket. In practice, voided game play data and wasted serial numbers on defective ticket stock is kept to a minimum so as not to affect the integrity of the prize structure, and create accounting and distribution problems.

In addition, this same problem is encountered with respect to commercial coupons, in which there are give away coupons having large prizes which must be accounted for and distributed to the public in accordance with the advertised prize structure.

SUMMARY OF THE INVENTION

Accordingly, an object of this invention is to provide an improved lottery ticket and commercial coupon manufacturing system and method.

Another object of this invention is to provide a method and system for producing lottery tickets and commercial coupons in which the prize structure integrity of the lottery game is preserved.

A further object of this invention is to provide an improved system and method for producing lottery tickets and commercial coupons by a more effective controlled production process using automatic scanning techniques.

Another object of this invention is to provide greater security in the production of instant lottery tickets/commercial coupons.

A further object of this invention is to provide increased protection against compromise through collusion by manufacturing personnel, and State Lottery personnel involved in the distribution of tickets to sales agents.

It is also an object of the invention to provide a cost effective method of producing such tickets by eliminating waste during the manufacturing process.

A further object of this invention is to provide a means for easily and conveniently identifying voided ticket stock and/or defectively printed tickets.

Another object of this invention is to improve the efficiency of the two pass production process and the detection of production voids.

The foregoing are achieved by the introduction of a second independent computer controlled ink jet imager for imaging book and ticket (serial) numbers on each ticket. The books/packs of tickets ordinarily consist of 500 tickets. In the two (2) imager all in-line mode, the book number groups are scrambled in a pseudo random fashion and book-ticket (serial) numbers are printed on the tickets independently from the game play data. Carton numbers are shuffled within pools of tickets and book numbers are shuffled within carton. The randomizing computer responsible for this shuffling is controlled by an arbitrary occurrence, such as time of day, to limit any systematic pattern in the assignment of book-ticket (serial) numbers.

The protection against counterfeiting is achieved by use of a validation number imaged on the ticket which is randomly correlated with the game play data, and does not have the constraint of a serial number which must be applied sequentially. Separate imaging operation and control of the book and ticket (serial) numbering permits greater security of providing a separate and independent tape for that imager physically independent of the tapes used for printing the game play data. Separate operation of the imager for placing book and ticket numbers on tickets, however, does require a control system that determines when serial numbers are to be applied to preserve prize structure integrity to the maximum, serial numbers should not be applied on tickets on which there is no valid game play data. Further, ticket serial numbers should not be printed on any defectively printed ticket stock. This problem is overcome by introducing a printing monitor system which controls operation of the ticket serial number imager.

To make this possible, a validation number which correlated with the game play is imaged during the first pass. It has no relation at all to the book and ticket number, so that even if one were to learn the identity of a validation number, it would be impossible to locate such ticket, since the book and ticket numbers (serial number) placed on the lottery ticket has no relation whatsoever to either the game play data or the validation number.

However, in order to preserve the prize structure, it is necessary that the presence of game play data on the lottery ticket be detected by the imager placing the serial number on the same lottery ticket. This problem is not encountered with a single computer printing process, since the operation of the game play data imaging and the serial number imaging are both one and the same and controlled by a common data tape.

In order to meet this requirement, it is necessary to monitor the operation of the first pass imaging status prior to placing serial numbers on the tickets, to avoid assignment of ticket serial numbers to imperfectly printed tickets or voided ticket stock.

This can be accomplished if the web itself carries an indication of whether or not the serial number imager should operater. Such indication would be dependent upon sensing apparatus which automatically makes the proper marking on the web which subsequently acts as an instruction for the second imager placing serial number information on the lottery tickets.

It is possible to monitor the web for graphical, play data, misregistration or other production defects. When defective printing occurs, such as ink-jet imaging interruption, this is sensed by a computer system that controls, through a control signal, the printing of product status marks on the web (an enable stripe). The control signal takes into account web speed and distance between the operation stations, to provide sufficient lead time between the point of imperfection and the point of application of serial number by the serial number imager. When the enable stripe is absent, this is sense and the control signal will turn off the serial number imager. In this manner, serial numbers are not placed upon defectively printed ticket stock that subsequently will be removed on inspection and which will adversely effect the prize structure of the lottery game.

Also, such monitoring makes it possible to immediately cover the game play data after the game play data is imaged so as to conceal this information from production personnel. Further, use of two independent magnetic tapes for game play data and ticket serial numbers respectively prevents any possibility of tracing winning tickets by the software.

These and other features and object of the invention will become apparent from the following description of the drawings and invention.

DESCRIPTION OF THE DRAWINGS

FIG. 8a is a portion of the flow diagram used in conjunction with the apparatus of FIG. 5.

FIG. 8b is a further continuation of the flow diagram of FIG. 8a.

FIG. 8c is a further continuation of the program of FIGS. 8a and 8b.

FIG. 8d is a further and final portion of the flow diagram of FIGS. 8a, 8b and 8c.

DESCRIPTION OF THE INVENTION

The computer ticket imaging system for making it possible to both increase security by eliminating correlation of game play data with ticket serial number, and for maintaining maximum prize structure integrity of the lottery game, involves the system using two independently controlled computer printers or imagers, and an integral monitoring system. The production process can be either a two pass or a single in-line one pass system. In the single in-line system, all operations are done in one pass through the printing stages. In the two pass system, described below, the application of lottery ticket serial numbers is accomplished via a separate second imaging line.

The web of sheet material on which the tickets are to be printed is initially graphically printed, subsequently imprinted with game play data and validation numbers, the game play data subsequently covered, and the tickets then numbered with an independent ticket serial number imager.

The web is preferably a relatively wide sheet of aluminized coated stock which is of sufficient width to permit simultaneous printing of three side by side sets of lottery tickets with a control strip along the side which is utilized for control marking purposes and subsequently trimmed from the web after completion of all printing. At the final stage the web is slit into one or more separate strips of lottery tickets and then fanfolded.

The covering material which is applied to conceal the game play data is preferably a multiple layer printer-applied composition overlay which is dried and when hardened provides a complete untamperable covering which can only be removed by rubbing or scratching it off to reveal the underlying game play data. It is destroyed as a film during the process of removal by the ticket purchaser and can not be replaced.

After the web passes through all of the printing and processing stages to produce final acceptable lottery tickets, it passes through a slitting stage which cuts the web into three different elongated strips of lottery tickets and also separates the control edge strip. The printing of the web involves simultaneous printing of the three strips of tickets with graphics, and with game play data and numbering printers.

Both the two pass system and the single pass system are readily usable with this invention.

For simplified illustration purposes in this application the web is shown as a single ticket line with control edge, and the two pass system is illustrated.

Figure 1:
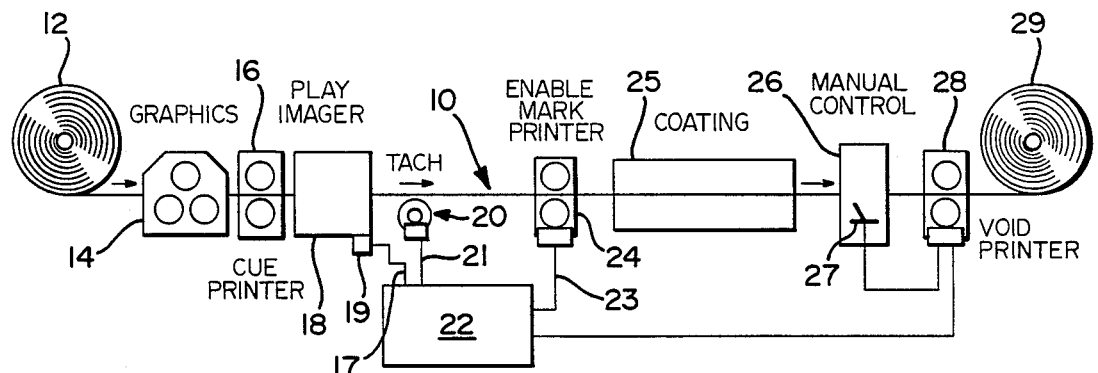
FIG. 1 is a diagrammatic view of one portion of the printing system.

Referring to the drawings, FIG. 1 discloses diagrammatically the first portion of the lottery ticket process, in which the web of heavy paper stock, generally indicated at 10, which is usually aluminum coated stock is unwound from the roll 12 and passes throgh the graphics printing stage 14. After leaving this stage, the web passes through a cue printer which prints a scannable cue or registration mark, if the web is correctly aligned, on the control edge C of the web at ten ticket repeat intervals. These cue marks are used by the ink jet imager 18 to determine when the web is correctly aligned and register the printing of the variable game play data to the fixed graphics previously printed at 14.

The web after leaving the cut printer 16, passes through a computer controlled printing station 18 which applies game play data to the graphics previously printed on the web. This is a commercially available ink jet printer, also preferred to as an imager. The imager simultaneously applies game play data on graphics for each previously printed ticket simultaneously with the respective and correlated validation number. The imager has a switch 19 which is closed during operation of the imager and opens when the imager does not function.

Figure 3A:
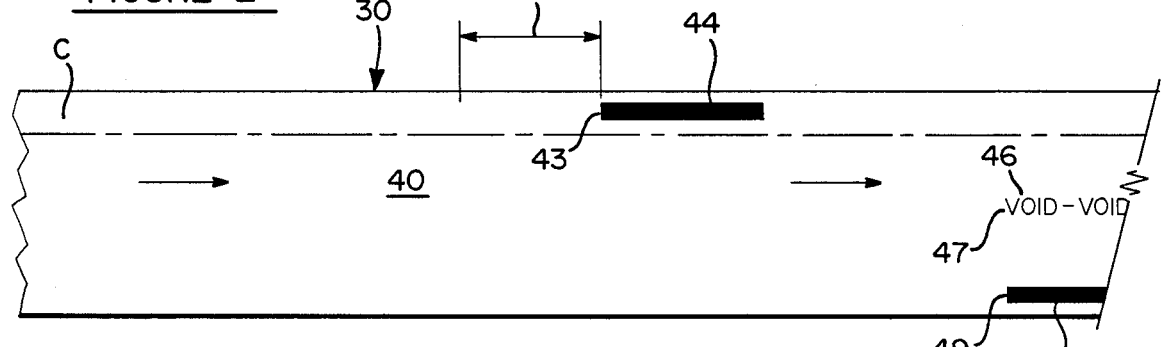
FIG. 3a is a bottom view of the web showing control printing thereon.

When switch 19 closes it activates a signal along line 17 to a programmable controller which generates a controlling signal through line 23. This signal activates the enables mark printer 24 which prints a 3 inch strip on the back of control strip C of the web, for each set of 10 tickets as shown in FIG. 3a by the strips 44. This stripe on the ticket set, indicates that the game play data on those tickets has been correctly imaged by the imager. The delay in the programmable controller is a function of the number of pulses received from tachometer 20 between the point of application of the imaging to the point of printing by the enable mark printer, so that when the imager is not functioning correctly and fails to image play data on a given ticket, that set of 10 tickets will not have the enable stripe printed on the back of the web at that point and for all subsequent ticket sets that have not been properly imaged. When the imager again functions correctly, the switch 19 will close and send a signal via line 17 directly to the probrammable controller 22 to signal printing of the enable stripe on the web back of the control strip of the web at the point the imager has resumed imaging data on the face of the lottery tickets.

The web then proceeds from enable mark printer 24 through the coating rollers generally indicated at 25 in which the play data placed on the lottery tickets by the imager 16 is covered with several successive security coats. At this point the lottery tickets have been printed, and are complete with the exception of the printing of ticket and book numbers. The web passes through a manual inspection station 26 at which the web is inspected visually to further insure that the tickets are properly printed. The inspector standing at the inspection station has a switch 27 which can be thrown to actuate a void printer, which prints a continuous void stripe 48 on the bottom face of the web as shown in FIGS. 3a and b.

Figure 5:
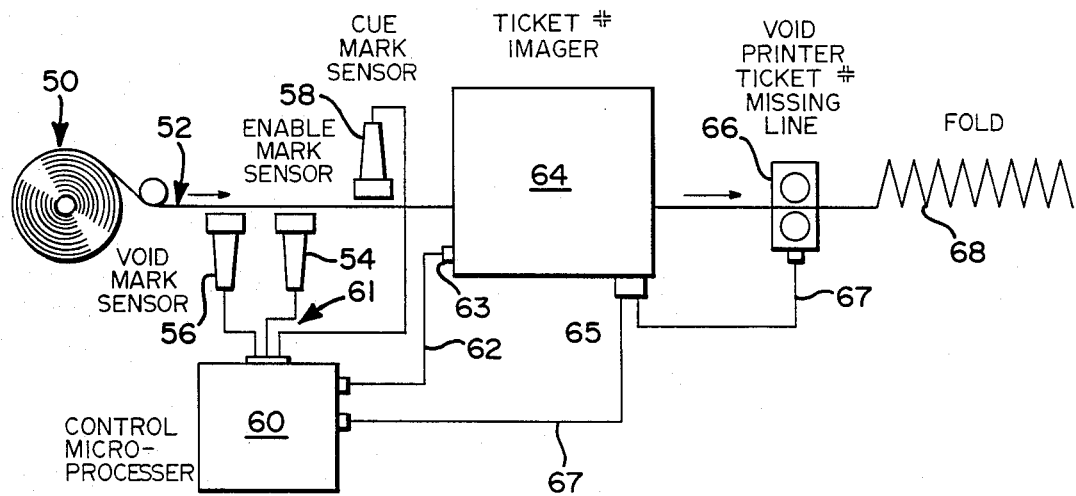
FIG. 5 is a view diagrammatically showing the final portion of the production process.

The void printer 28 is also actuated automatically by the programmable controller. In this case, the delay, controlled by the input pulses along line 21, is longer than that for the enable mark printer 24 such that when the defective ticket reaches the void printer station that ticket and all subsequent defective tickets will be marked automatically with a void indication on the back of the web. The web is then wound on roll 29 and subsequently moved to a new printing line shown diagrammatically in FIG. 5. However, it should be noted that it is possible to run the web continuously through the second stage of processing as shown in FIG. 5, without winding the web on roll 29, and subsequently processing in a separate production line. In this case, there are not a succession of rolls 29 of printed lottery tickets, that can be randomly selected prior to book-ticket imaging, and therefore the mixing for random numbering must be done in the second imager.

Figure 2:
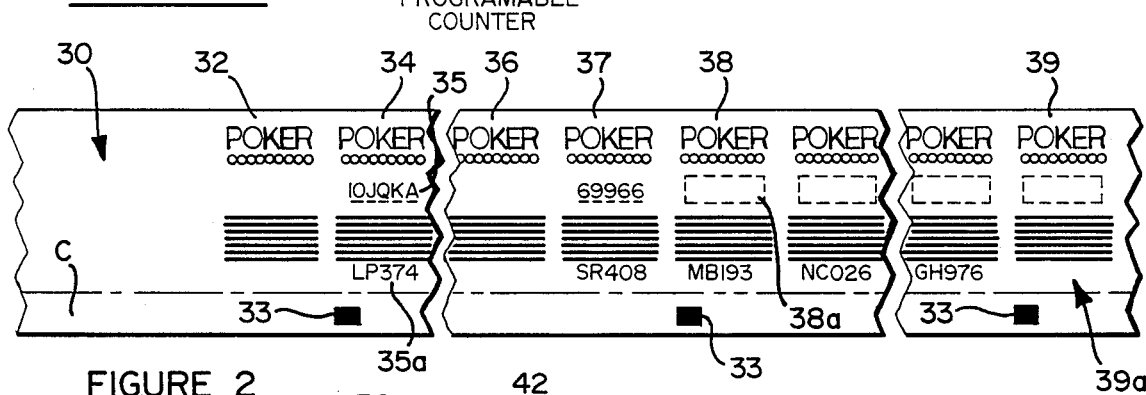
FIG. 2 is a top view of the web showing progressive stages in the printing process.

FIG. 2 shows the top face of an enlarged portion of the web generally indicated at 30 in which the top surface has the plurality of printing components thereon. For purposes of example, the lottery ticket printing is shown correlated with the diagrmmatic view of FIG. 1 and in general alignment with the components of the printing system as shown in FIG. 1, such that it can be seen that the graphics material generally indicated at the graphics printed ticket 32 is shown with a title and instruction material that would be standard for every lottery ticket and this material, as illustrated, would be found on the top surface of the web after it leaves the graphics printing stage 14. On leaving the cue printer stage 16, a small cue mark 33 is imprinted on the web on the control strip C and subsequently sensed by the imager 18 to register the game play data to each ten ticket set of graphic printing. This cue printer mark is placed on the web for every ten tickets printed. The cut printer is mechanically registered to the graphic press to provide a mark for each group of ten tickets on a repeat pattern.

The web 30 then has the game and validation data imaged thereon by the imager 18 and as shown in FIG. 2, the lottery ticket 34 has game play data 35 and validation number 35a, which are placed thereon when the ticket passes through the imaging stage. Note that the ticket indicated at 36 is defective since the game play data space and the validation number space are blank, Apparently, the imager was not operational when this ticket, (usually, a group of tickets) passed through the imaging stage. When the imager is inoperative, the switch 19 would be deactivated and therefore no enable stripe is printed. Tickets beginning with ticket 38 have been completely processed and have the game play data covered as indicated at 38a.

The back side of the web 40 shown in FIG. 3a indicates that the ten ticket set aligned with the enable mark has booth good graphics and game play data. The enable printer 24 is shown to have placed an enable stripe 44 which extends from 43 after ticket 36 to 45. The stripe indicates validly printed tickets. Since this is the underside of the section of the web as shown in FIG. 2, the stripe indicates that valid game play data has been placed on the ten ticket set (web partially cut away) immediately above and aligned with the stripe 44, while the last ticket, 39, although having good graphic printing, is void, since the validation number area 39a is blank. The "void" strip 46 and the void stripe 48 of FIG. 3a, showing the underside of the web of FIG. 2 indicates that game play data and validation numbers are not placed on this ticket. The 'VOID' strip is placed on the central underside of the web, and the void strips 48 is placed on the far edge of the web. They indicate that the last ten ticket set is void. The leading edge 47 of the void strip 46 begins when an imager fault or other manual control triggers the void printer. Note that each ten ticket set has either an enable or a void stripe, or both (when manual void control is activated).

Figure 3B:
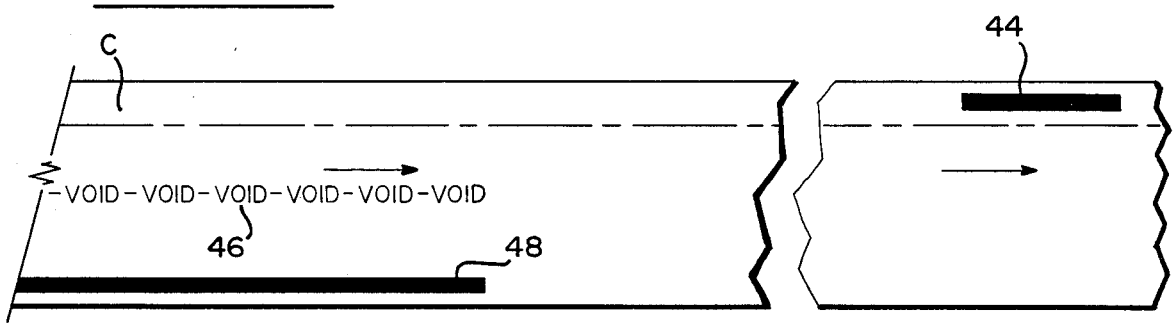
FIG. 3b is a bottom view of a further section of the web with the control printing thereon.

FIG. 3b shows a continuation of the right side of the web of FIG. 3a, and indicates that a series of tickets were void as indicated by the length of the void strip 46. The tickets at the right side of this extended portion of the web as indicated by the enable stripe 44 are all good tickets.

Figure 4:
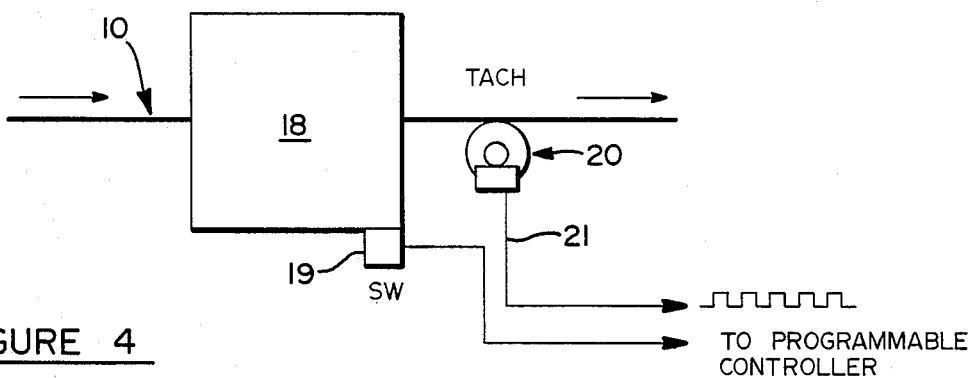
FIG. 4 is a diagram of the printing and sensing apparatus portion of the system of FIG. 1.

FIG. 4 shows an enlarged view of the imager, which is a Mead ink jet printer at 18, as the web 10 passes through it and over the tachometer from which the pulse train shown along line 21 are produced. Switch 19 indicates the imager status, being in the open state when the printer is not imaging. The The pulse train is received by the programmable controller which is set to count the number of pulses for providing the appropriate delay in the separate control signals sent to the enable printer and to the void printer.

FIG. 5 shows the second pass of the ticket web required to complete printing of the tickets. This pass places ticket serial number information on the valid tickets which are not defective in response to the cue mark, enable mark, and void mark as they are references to the individual tickets concerned. In this way, ticket serial nubmers are applied only to valid nondefective tickets.

The web roll generally indicated at 50 is the roll corresponding to roll 29 of FIG. 1. Now the web 52 passes through a battery of sensors and an imaging jet imager for application of serial numbers and ultimately to a fan-folding operation after slitting. The web 52 passes above the void mark sensor 56 and the enable mark sensor 54 which are located below the web to sense te respective void strip and enable stripes. The cue mark sensor 58 scans the top of the web above the area where the cue marks will appear along the edge. The inputs from these sensor are applied to the microprocessor 60. It provides the cntrol function for both a delay and also the application of a control signal which is sent along line 62 to the imager 64, controls through a switch 63. The imager is controlled through a switch 63 which is responsive to the control signal from the microprocessor 60.

It will be noted that this arrangement provides for shut-down of the serial number imager 64 whenever one of the three sensors indicates that its particular signal does not indicate satisfactory printing. In addition a void imprinter 66 is controlled via line 67 through switch 65, and is activated when the imager 64 is not printing. After passing through this stage it passes through a folding stage generally indicated at 68.

Figure 6:
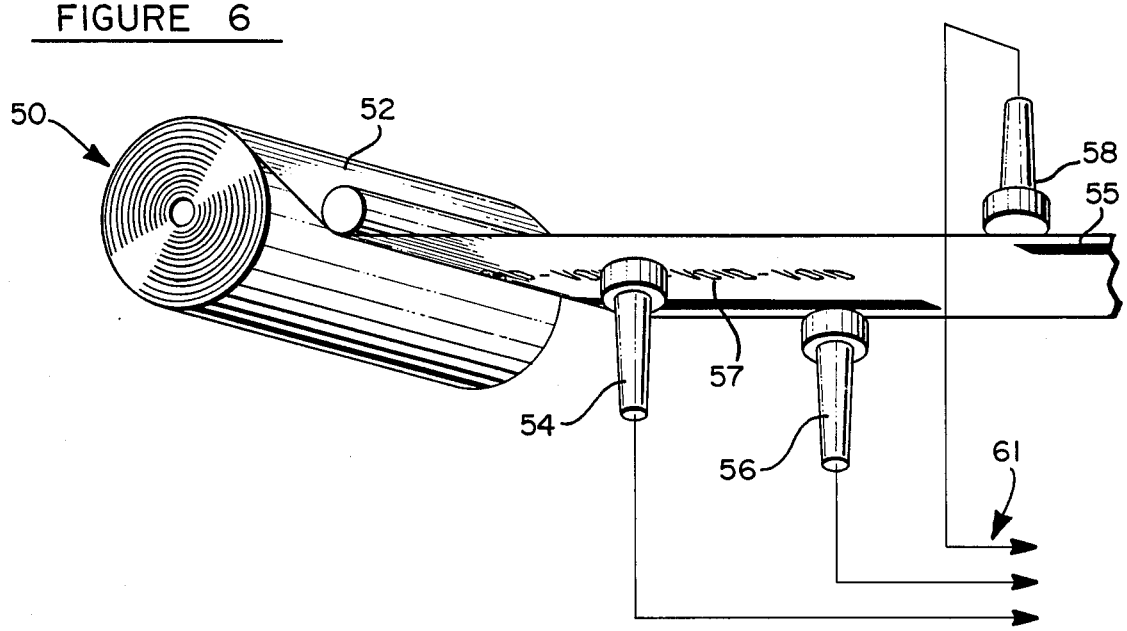
FIG. 6 is a bottom perspective view of the web showing the sensing area arrangement of a portion of the apparatus of FIG. 5.

The specific structural arrangement of the sensing section is shown in FIG. 6 in which the roll 50 to passes between the sensing elements which pickup the respective control marks on the web as shown. The enable mark sensor 54 will sense the presence or absence of the enable strip 55. The void mark sensor 56 is in alignment with the void stripe 57, while the cue mark sensor 58 senses the cue mark on the top face at the edge of the web. The outputs from these units pass through a common cable 61 to the control micro-processor.

Figure 7:
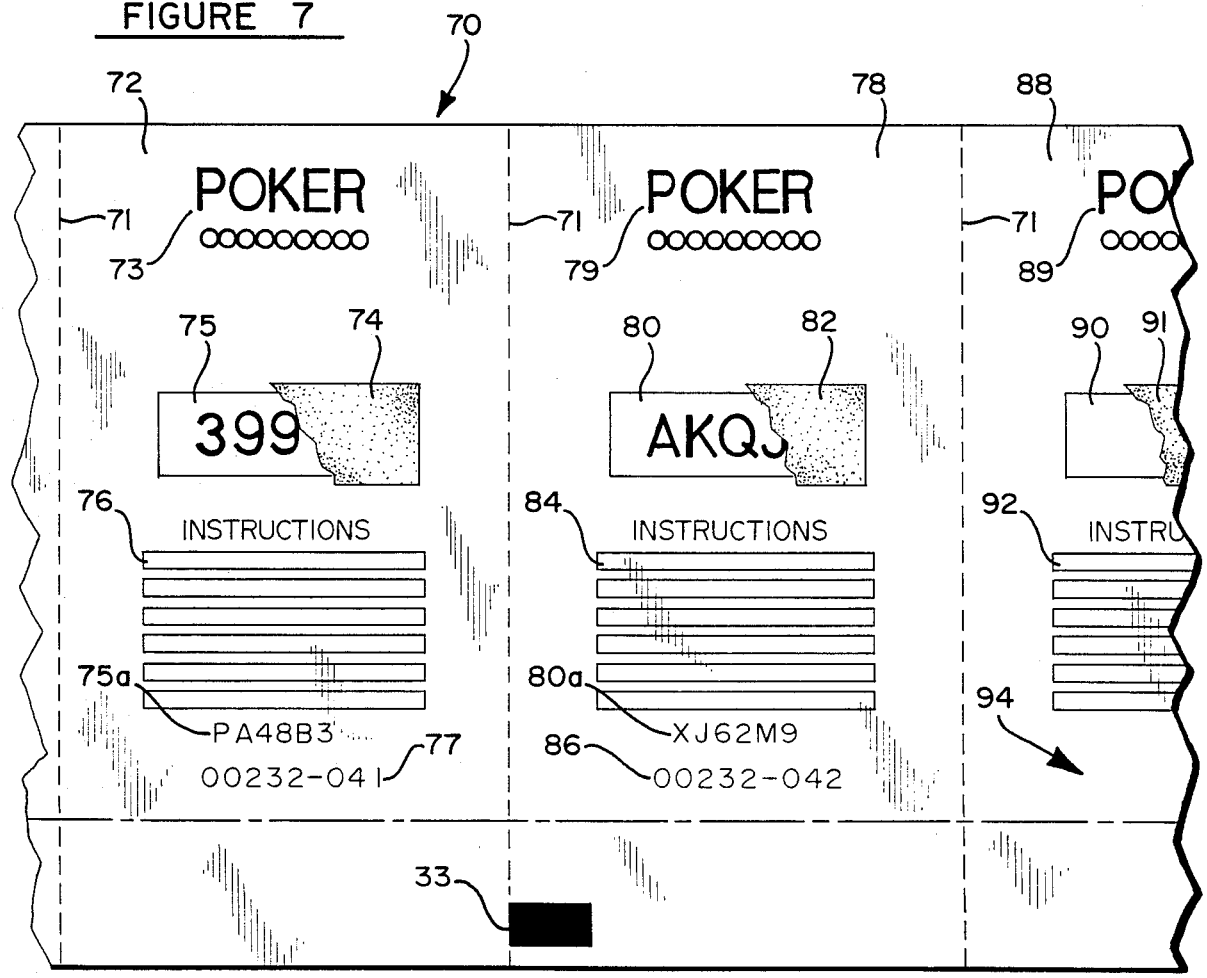
FIG. 7 is an enlarged portion of the web showing the finished printed tickets.

Referring to FIG. 7, a completed printing portion of the web is shown after it is passed through the second and final stage of FIG. 5.

The web generally indicated at 70 has an upper face aluminum surface on which the indicia for the tickets is imaged. The tickets are separated by a perforated line 71 which is also placed on the web during the course of manufacture, but it is not shown in the previous figures.

The first ticket 72 is a completely printed ticket with a graphic printed heating 73, covering layers 74 thereon which are partially cutaway to show the game play data 75. The validation number is shown at 75A. The instructions or other graphically printed material 76 are also shown. Inasmuch as this ticket is a complete ticket including both game play data and graphics as indicated by the enable mark 44, ticket number data 77 referring to book or pack number in addition to the specific ticket number "041" is printed on the ticket, either on the face or on the back thereof.

The second ticket 78 has the graphic heading 79 with correct game play data generally indicated at 80 and a partially cutaway showing of the covering 82. The covering consists of a latex rub-off and security overprint layers. The remaining graphic section 84 which is printed concurrently with the section 79 during the graphic printing at the initial stage of the process is shown. The book-ticket (serial number) data is shown at 86.

The last ticket 88, is partially shown, with part of the graphics sections 89 and 92 as shown. In this instance, it should be noted that there is no game play data in the game play data block 90 as indicated by the partially cutaway portion of the coating seal 91. It should be noted that inasmuch as this ticket is not complete, there should not be any book-ticket numbering of the ticket, and as indicated at 94. This is one of the conditions detected by the switch 65 when the jet imager 64 is not operable.

FIGS. 8a, 8b, 8c and 8d disclose the flow diagram for the software of the micro-processor control system shown in FIG. 5, and generally indicated at 60.

The micro-processor is an Intel 8085 unit, and the scanners are Banner photo-sensitive units.

It will thus be seen that there is provided with this two pass system (which also could be a single pass in-line system) automatic marking of the web to indicate defective ticket or ticket sections where graphics, game play data, or ticket numbering would be lacking. These marks then later are used to automatically control the application of book-ticket numbers such that no defective tickets are imaged with book-ticket numbers.

While this invention is described as having a preferred design, it is understood that it is capable of further modifications, uses and/or adaptations of the invention following in general the principles of the invention and including such departures from the present disclosure as come within known or customary practice in the art to which the invention pertains, and as may be applied to the central features hereinbefore set forth, and fall within the scope of the invention of the limits of the appended claims.

We claim:

1. A system for printing of instant lottery and coupon tickets which provides improved security and prize structure integrity, comprising:
    (a) a rotary press printing stage for graphically printing a series of successive tickets on a continuous fast moving web of ticket stock,
    (b) first web marking means for automatically sensing whether correct graphics have been applied to the web and automatically placing a marking thereon indicative of whether that section of the web contains acceptably printed tickets,
    (c) a first computer controlled ink jet imager responsive to a pseudo random program, for placing different game play data on each successive ticket of the web at a speed which precludes personal observation of individual ticket numbers and for also placing a pseudo random validation number on each ticket which is correlated in a seemingly random fashion with the game play data,
    (d) coating means for immediately covering the game play data applied by the first computer controlled ink jet imager to preclude personal observation thereof,
    (e) second web marking means for automatically sensing whether such tickets have been correctly imaged with game play data and validation numbers and for automatically placing a marking on the web indicative thereof,
    (f) a second computer controlled ink jet imager for placing book-ticket numbers (serial numbers) on each successive ticket, which are uncorrelated with respect to the prior applied imaged game play data and validation numbers,
    (g) sensing means physically positioned adjacent the web in line before the second computer controlled imager for scanning the web for markings indicating whether tickets are defective or valid and generating a signal indicative of the presence of these markings, and
    (h) control means connected to the sensing means and to the second computer controlled imager for receiving the signal from the sensing means and generating a control signal which controls operation of the second imager so as to preclude the imaging of a book-ticket (serial number) on a given ticket when markings on the web indicate that such tickets are defective.

2. The system for printing of lottery and coupon tickets for providing improved security and prize structure integrity as set forth in claim 1, wherein:
    control signal operates the second computer controlled imager so that operation of the second computer controlled imager for a given ticket is timed for exactly the same moment the ticket arrives at the second imager.

3. The system for printing of lottery and coupon tickets for providing improved security and prize structure integrity as set forth in claim 1, wherein:
    (a) the graphic printing, first ink jet imager, coating means and first marking means constitute a first pass line of production in which graphics and game play data and validation numbers are imaged,
    (b) first support means for winding the web onto a roll such that a plurality of separate rolls of complete tickets without imaged book/ticket (serial number) are contained,
    (c) the sensing means, control means, and second ink jet imager constitute a second off-line book-ticket (serial number) imaging line of production, and
    (d) second support means for supporting a randomly selected roll of tickets from an accumulated group of first line of production rolls and separately feeding the web of such roll through the second line of production for imaging book-ticket (serial numbers) thereon.

4. The system for printing of lottery and coupon tickets for providing improved security and prize the structure integrity as set forth in claim 3, wherein:
a control signal operates the second computer controlled imager so that operation of the second computer controlled imager for a given ticket is timed for exactly the same moment the ticket arrives at the second imager.

5. The system for printing of lottery and coupon tickets for providing improved security and prize structure integrity as set forth in claim 24, wherein:
the second ink jet imager operates from a pseudo random controlled magnetic tape which shuffles assigned cartons of numbers within pools of tickets and book-pact numbers within cartons.

6. The system for printing of lottery and coupon tickets for providing improved security and prize structure integrity as set forth in claim 1, wherein:
the control means includes a micro-processor which is programmed to receive the sensing signals and provide a web speed dependent control signal for the second computer controlled ink jet imager.

7. The system for printing of lottery and coupon tickets for providing improved security and prize structure integrity as set forth in claim 1, wherein:
the web has one or more trimmable removable strips located immediately beside the printed lottery tickets on which the markings are placed.

8. The system for printing of lottery and coupon tickets for providing improved security and prize structure integrity as set forth in claim 1, wherein:
means for placing a marking on the web includes a printing means for printing on the web a readable mark which can readily be detected by the sensing means.

9. A system for printing of lottery and coupon tickets for providing improved security and prize structure integrity as set forth in claim 1, wherein:
web travel monitoring means is included as part of the sensing means for controlling registration of markings corresponding to the tickets and producing signals which vary according to the travel of the web.

10. A system for printing of lottery and coupon tickets for providing improved security and prize structure integrity as set forth in claim 9, wherein:
the web travel monitoring means is a tachometer which produces a series of pulses proportional to travel of the web.

11. A system for printing of instant lottery coupon tickets which provides improved security and prize structure integrity, comprising:
(a) a series of printing stages for graphically printing a series of successive tickets on a continuous fast moving web of ticket stock,
(b) a first computer controlled ink jet imager responsive to a pseudo random program, for placing different game play data on each successive ticket of the web at a speed which precludes personal observation of individual ticket numbers and for also placing a pseudo random validation number on each ticket which is correlated in a seemingly random fashion with the game plate data,
(c) means for automatically identifying at high web speeds which preclude observation by an observer, those tickets that are not printed with game play data, and for placing a marking on the web to indicate whether such tickets are defective,
(d) coating means for immediately covering the game play data applied by the first computer controlled ink jet imager to preclude personal observation of such data,
(e) a second computer controlled in jet imager for placing book-ticket numbers (serial numbers) on each successive ticket, which are uncorrelated with respect to the prior applied imaged game play data and validation numbers,
(f) sensing means physically positioned adjacent the web in line before the second computer controlled imager for scanning the web for markings indicating whether tickets are defective or valid and generating a signal indicative of the presence of these markings, and
(g) control means connected to the sensing means and to the second computer controlled imager for receiving the signal from the sensing means and generating a control signal which controls operation of the second imager so as to preclude the imaging of a book-ticket (serial number) on a given ticket when markings on the web indicate that such tickets are defective.

12. The system for providing improved security and prize structure integrity in the printing of lottery and coupon tickets, as set forth in claim 11, wherein:
the sensing and control means includes a microprocessor means for receiving the sensing signals and for providing the control signal such that imager operation is coordinated with the location of the markings on the web.

13. The system for providing improved security and prize structure integrity in the printing of lottery and coupon tickets, as set forth in claim 11, wherein:
marking means is an enabling printer which prints an enabling mark on the web for subsequent photoelectrical scanning.

14. The system for providing improved security and prize structure integrity in the printing of lottery and coupon tickets, as set forth in claim 11, wherein:
printing means is part of the marking means for printing a void stripe on those tickets which are defective.

15. A method for providing improved security and prize structure integrity in the printing of lottery and coupon tickets, comprising the steps of:
(a) passing a continuous web of ticket stock suitable for printing of tickets through a graphic printing stage,
(b) passing the continuous web through a first computer controlled ink jet imaging stage which places game play data and correlated validation numbers on each of the previously printed graphic tickets on the web at a rate too fast for an observer to comprehend the game play data,
(c) sensing with a sensing means if the first computer controlled imager has correctly imaged each ticket,
(d) immediately applying an overlay on the play game data to provide a tamper-proof removable covering,
(e) numbering tickets with numbers which are uncorrelated with respect to play game data with a second independently controlled imaging means for imaging pseudo random shuffled book-ticket serial numbers on each of the tickets in accordance with an independent computer programmed tape, (f) controlling operation of the second computer controlled imager in placing serial numbers on the web in response to the sensing means, to prevent imaging of ticket serial numbers on defective tickets.

16. A method for providing improved security and prize structure integrity in the printing of lottery tickets and coupon tickets, as set forth in claim 15, including:

(a) applying a marking on the web when the imaged data has been properly placed on the web, and (b) sensing the marking on the web and controlling operation of the second computer controlled imager to prevent imaging of book-ticket numbers on defective tickets and to insure imaging book-ticket numbers on valid tickets.

17. The method for providing improved security and prize structure integrity in the printing of lottery and coupon tickets, as set forth in claim 16, including:

(a) registering the marking on the web to permit the second computer controlled imager to accurately commence or cease printing at the position on the web which corresponds to the location of the valid or defective tickets.

18. The method for providing improved security and prize structure integrity in the printing of lottery and coupon tickets, as set forth in claim 17, including:

marking the web with a visible marking identifying defective tickets.

19. A method for printing of lottery and coupon tickets which provide improved security and prize structure integrity, comprising:

(a) printing ticket graphics on a continuous web of ticket stock suitable for printing of tickets by passing it through a graphics printing stage.

(b) imaging the web by subsequently passing it through a first computer controlled ink jet imaging stage which places game play data and also correlated validation numbers on each of the previously printed tickets at a rate too fast for an observer to comprehend the game play data, (c) sensing with a sensing means whether the imaged data of the first computer controlled imager has been correctly imaged on each ticket.

(d) immediately applying an overlay on the play game data to provide a tamper-roof removable covering, (e) marking the web in response to the sensing means to indicate whether the imaged data has been correctly imaged, (f) rewinding the web of tickets which are complete except for application of book-ticket serial numbers and storing them as printed rolls for subsequent application of such numbers, (g) randomly selecting one of the printed rolls and placing it in a second line having a second imager for imaging book-ticket serial numbers which are uncorrelated with play game data, (h) passing the web of the selected roll through a sensing means for detecting markings indicating whether tickets are valid or defective and generating signals indicative thereof, (i) receiving the sensing signals and producing a control signal responsive to the markings for controlling the operation of the second imager such that it will apply book-ticket numbers only to valid tickets.

20. The method for printing of lottery and coupon tickets which provides improved security and prize structure integrity, as set forth in claim 19, wherein:

(a) applying the marking on the web when the imaged data has been properly placed on the web, and (b) sensing the marking on the web and controlling operation of the second computer controlled imager to prevent imaging of book-ticket numbers on defective tickets and to insure imaging book-ticket numbers on valid tickets.

21. The method for printing of lottery and coupon tickets which provides improved security and prize structure integrity, as set forth in claim 19, wherein:

spacing the markings on the web to permit the second computer controlled imager to accurately commence or cease printing at the point on the web which corresponds to the location of the valid or defective tickets.

22. A method for printing of lottery and coupon tickets which provides improved security and prize structure integrity, as set forth in claim 19, wherein:

marking the web with a visible marking identifying defective tickets.

* * * * *